US007022793B2

(12) United States Patent
Galimberti et al.

(10) Patent No.: US 7,022,793 B2
(45) Date of Patent: Apr. 4, 2006

(54) PROCESS FOR THE TREATMENT OF POLYMER COMPOSITIONS

(75) Inventors: Maurizio Galimberti, Milan (IT); Angelo Ferraro, Bologna (IT); Giovanni Baruzzi, Ferrara (IT); Ofelia Fusco, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/497,000

(22) PCT Filed: Nov. 22, 2002

(86) PCT No.: PCT/EP02/13326

§ 371 (c)(1),
(2), (4) Date: May 27, 2004

(87) PCT Pub. No.: WO03/046022

PCT Pub. Date: Jun. 5, 2003

(65) Prior Publication Data

US 2005/0049371 A1 Mar. 3, 2005

(30) Foreign Application Priority Data

Nov. 27, 2001 (EP) .................................. 01204693

(51) Int. Cl.
*C08F 236/20* (2006.01)
*C08L 23/10* (2006.01)
*C08J 3/20* (2006.01)
*C08J 3/22* (2006.01)

(52) U.S. Cl. .................. 526/336; 526/124.3; 526/160; 526/339; 502/108; 502/109; 502/132; 502/134; 502/152

(58) Field of Classification Search .............. 526/336, 526/339, 124.3, 168; 502/108, 109, 132, 502/134, 152
See application file for complete search history.

(56) References Cited

U.S. PATENT DOCUMENTS

| 4,399,054 | A |   | 8/1983  | Ferraris et al. ......... 252/429 B |
|-----------|---|---|---------|-------------------------------------|
| 4,871,705 | A |   | 10/1989 | Hoel .......................... 502/117 |
| 5,001,205 | A |   | 3/1991  | Hoel .......................... 526/128 |
| 5,221,651 | A |   | 6/1993  | Sacchetti et al. ............ 502/126 |
| 5,229,478 | A |   | 7/1993  | Floyd et al. ................. 526/160 |
| 5,239,022 | A |   | 8/1993  | Winter et al. ............... 526/127 |
| 5,243,001 | A |   | 9/1993  | Winter et al. ............... 526/127 |
| 5,324,800 | A |   | 6/1994  | Welborn, Jr. et al. ....... 526/160 |
| 5,442,020 | A |   | 8/1995  | Davis .......................... 526/127 |
| 5,556,928 | A |   | 9/1996  | Devore et al. .............. 526/127 |
| 5,756,613 | A | * | 5/1998  | Costa et al. ................. 526/159 |
| 6,723,792 | B1| * | 4/2004  | Zucchelli ..................... 525/191 |

FOREIGN PATENT DOCUMENTS

| EP | 0045977 | 2/1982 |
|----|---------|--------|
| EP | 0129368 | 12/1984 |
| EP | 0347129 | 12/1989 |
| EP | 0361494 | 4/1990 |
| EP | 0395083 | 10/1990 |
| EP | 0416815 | 3/1991 |
| EP | 0420436 | 4/1991 |
| EP | 0485820 | 5/1992 |
| EP | 0485822 | 5/1992 |
| EP | 0593083 | 4/1994 |
| EP | 0643066 | 3/1995 |
| EP | 0658577 | 6/1995 |
| EP | 0671404 | 9/1995 |
| EP | 1065220 | 1/2001 |
| WO | 9102012 | 2/1991 |
| WO | 9104257 | 4/1991 |
| WO | 9200333 | 1/1992 |
| WO | 9516716 | 6/1995 |
| WO | 9602583 | 2/1996 |
| WO | 9611218 | 4/1996 |
| WO | 9622995 | 8/1996 |
| WO | 9822486 | 5/1998 |
| WO | 9921899 | 5/1999 |
| WO | 9924446 | 5/1999 |
| WO | 9937698 | 7/1999 |
| WO | 9940129 | 8/1999 |
| WO | 9945046 | 9/1999 |
| WO | 9958539 | 11/1999 |
| WO | 0000517 | 1/2000 |
| WO | 0011057 | 3/2000 |
| WO | 0121674 | 3/2001 |
| WO | 0146272 | 6/2001 |
| WO | 0222732 | 3/2002 |

OTHER PUBLICATIONS

W. Kaminsky et al., "Ethylene Propylene Diene Terpolymers Produced with a Homogeneous and Highly Active Zirconium Catalyst;" *Journal of Polymer Science*; vol. 23, p. 2151-2164 (1985).

* cited by examiner

*Primary Examiner*—Caixia Lu

(57) ABSTRACT

A process for the preparation of heterophasic elastomeric polymer comprising the step of polymerizing ethylene, an alpha-olefin $CH_2=CHL$, where L is an alkyl, cycloalkyl or aryl radical with 1–10 carbon atoms and a non-conjugated diene in the presence of a catalyst system comprising a transition metal catalyst component supported on a porous alpha-olefin polymer, characterized in that at least part of the diene is impregnated on the porous alpha-olefin polymer.

19 Claims, No Drawings

PROCESS FOR THE TREATMENT OF POLYMER COMPOSITIONS

This application is the U.S. national phase of International Application PCT/EP02/13326, filed Nov. 22, 2002.

The present invention relates to a process for the preparation of an elastomeric polymer composition comprising the steps of polymerizing ethylene, an alpha-olefin and a non-conjugated diene in the presence of a catalyst system based on a transition metal component supported on a porous polyolefin.

The most common polyolefin elastomers produced are copolymers of ethylene and propylene (EPM) and terpolymers of ethylene, propylene and a diene (EPDM). Ordinary EPDM elastomers can be cured using such curatives as organic peroxides, phenolic resins or sulphur. In most current EPDM production, the catalysts conventionally employed in the production of high molecular weight EPDM elastomers are soluble vanadium catalysts such as $VC_4$, $VOCl_3$, $VO(Ac)_3$, $V(Acac)_3$ or $VO(OR)_3$ where R is an alkyl group together with an organoaluminum compound. The activity of the vanadium catalysts are relatively low, e.g., producing 5–20 kg polymer/g vanadium.

Metallocene compounds have been used for the production of EPDM, for example Kaminsky et al., J. Poly. Sc., Vol. 23, 2151–2164 (1985) discloses the use of a metallocene-methylaluminoxane (MAO) catalyst system to produce low molecular weight EPDM elastomers. Such catalysts require long reaction times and provide low yields and are therefore impractical for commercial EPDM manufacture. Other polymerization processes for producing EPDM featuring the use of a metallocene catalyst activated by an aluminoxane such as MAO are described in U.S. Pat. Nos. 4,871,705, 5,001,205, 5,229,478 and 5,442,020, EP 347,129 and WO 95/16716. In particular, EP 593 083 describes a gas phase polymerization process for producing EPDM employing a bridged metallocene catalyst introduced in the reactor in the form of droplets.

EPDM terpolymers are often used as components for blends with other polymer having different characteristics, such as different crystallinity. In particular they are blended with isotactic polypropylene for obtaining the so-called TPV polymer.

One method of making the above mentioned blends is by mixing two different polymers after they have been polymerized to achieve a target set of properties. Such a method is very expensive and time-consuming and making reactor blends is much more desirable.

Blends by direct polymerization are well known in the art EPDM can be blended by using soluble vanadium based catalysts by using reactors in series and making a polymer with different properties in each reactor.

WO 99/45046 relates to a process for producing reactor blends in which, in the presence of a metallocene catalyst in one reactor EPDM terpolymers are produced and in a second reactor propylene is polymerized in the presence of the polymer produced in the first reactor.

A drawback of obtaining EPDM by using metallocene catalysts, is that the presence of the diene lowers the activity of the catalyst. Moreover, often the non-conjugated diene has a poor randomisation in the polymeric chain, especially in a gas phase process.

An object of the present invention is a process for the preparation of an elastomeric polymer composition containing EPDM polymers, in high yields and with a random incorporation of the non-conjugated diene. This can be achieved according to the invention by impregnating the diene monomer onto a porous alpha-olefin polymer.

Thus, the present invention provides a process for the preparation of elastomeric polymer compositions comprising a polymerization step in which ethylene, an alpha-olefin of formula $CH_2=CHL$, where L is an alyl, cycloalkyl or aryl radical with 1–20 carbon atoms and a non-conjugated diene are polymerized in the presence of a catalyst system comprising a transition metal catalyst component supported on a porous alpha-olefin polymer, characterized in that at least part of the diene is impregnated on the porous alpha-olefin polymer. According to embodiments of the invention at least 10%, or at least 20% or at least 50% of the total diene used, is impregnated on a porous alpha-olefin polymer.

For the purpose of the present invention the term impregnated means that the diene is retained in the porous alpha-olefin polymer.

According to an embodiment, the process of the present invention comprises the following steps:
a) impregnating a porous alpha-olefin polymer with, in any order, a non conjugated diene and a catalyst system based on a transition metal compound; and then
b) polymerizing ethylene, an alpha olefin of formula $CH_2=CHL$, where L is an alkyl, cycloalkyl or aryl radical with 1–10 carbon atoms, and optionally a non-conjugated diene in the presence of the supported catalyst obtained in step a).

According to another embodiment, the impregnation step a) is performed by:
a1) first impregnating the porous alpha-olefin polymer with the non-conjugated diene; and then
a2) impregnating the product obtained in step a1) with the catalyst based on a transition metal compound.

The polymerization process can be carried out in the liquid phase in the presence or absence of an inert hydrocarbon solvent, or in the gas phase. When present, the hydrocarbon solvent can be either aromatic, such as toluene, or aliphatic, such as propane, hexane, heptane, isobutane or cyclohexane. When the polymerization step b) is carried out in the gas phase, it is suitably done in a fluidized bed reactor.

The polymerization temperature is generally comprised between $-100°$ C. and $+200°$ C., and, suitably, between $10°$ C. and $+90°$ C. The polymerization pressure is generally comprised between 0.5 and 100 bar.

The porous alpha-olefin polymer is a polymer obtained by polymerizing ethylene or olefins of formula $CH_2=CHL$, where L is an alkyl, cycloalkyl or aryl radical with 1–20 carbon atoms. examples of alpha-olefins polymers are: polyethylene, polypropylene, polybutene, copolymers of propylene and copolymers of ethylene. It is generically used in an amount comprised between 5% and 70% by weight of the total polymer produced in the process, preferably between 10% and 50% by weight, more preferably between 25% and 50% by weight. Said alpha-olefin polymer has a pore volume greater than 0.45 cc/g (determined by mercury absorption); preferably, greater than 0.5 cc/g; more preferably greater than 0.55 cc/g. In a suitable embodiment said porous alpha-olefin polymer is an homopolymer or a copolymer of propylene or ethylene.

Two particularly suitable classes of porous propylene polymers are those obtained according to WO 0146272 and WO 02/22732 particularly good results are obtained when the catalyst described in WO 0146272 is used with the process described in WO 02/22732. Polymers obtained according to WO 0146272 have a high content of the so-called stereoblocks, i.e. of polymer fractions which, although predominantly isotactic, contain a not negligible amount of non-isotactic sequences of propylene units. In the conventional fractionation techniques such as the TREF (Temperature Rising Elution Temperature) those fractions are eluted at temperatures lower than those necessary for the more isotactic fractions. The polymers obtained according to the process described in WO 02/22732 show improved porosities.

A suitable propylene homopolymer used as support in step a) has the following characteristics:
  flexural modulus (METHOD ASTM D-5023) lower than 1200 MPa; preferably lower than 1000 MPa, more preferably lower than 900 MPa.
  in the Temperature Rising Elution Temperature analysis (TREF) the fraction eluted at a temperature range from 25° C. to 97° is higher than 20% preferably higher than 30%; more preferably higher than 40% of the total polymer eluted;
  a melting enthalpy lower than 90 J/g; preferably lower than 80 J/g; more preferably lower than 70 J/g;

a pore volume (determined by mercury absorption) greater than 0.45 cc/g; preferably greater than 0.5 cc/g; more preferably greater than 0.55 cc/g.

The use of this class of polymers give rise a better impregnation of the diene and of the transition metal catalyst component that leads to an increasing of the activity of the catalyst system in the presence of the diene and to a reducing of the fouling. Moreover, with this polymer the compatibility between the polymeric matrix and the terpolymer is enhanced.

Preferably the elastomeric texpolymer prepared in step b) contains from 20% to 90% by weight of ethylene derived units, more preferably from 30% to 85% by weight, even more preferably from 35% to 70% by weight.

In a suitable embodiment, the alpha-olefin component of formula $CH_2=CHL$ is selected from the group consisting of $C_1-C_{20}$ alpha-olefins. Illustrative non-limiting examples of such alpha-olefins are propylene, 1-butene, 1-pentene, 1-hexene, 1-octene and 1-dodecene. Preferred alpha-olefin is propylene. Elastomeric polymers generally contain from 10% to 80% by weight, more preferably from 20% to 65% by weight, of $CH_2=CHL$ derived units, preferably of propylene derived units.

The non-conjugated diene component of the terpolymer, which is impregnated on the porous alpha olefin polymer at least in part before the polymerization step, can be a straight chain, branched chain or cyclic hydrocarbon diene having from 6 to 20 carbon atoms. Examples of suitable non-conjugated dienes are:
  straight chain acyclic dienes, such as 1,4hexadiene and 1,6-octadiene;
  branched chain acyclic dienes, such as 5-methyl-1,4hexadiene, 3,7-dimethyl-1,6-octadiene, 3,7-dimethyl-1,7-octadiene and mixed isomers of dihydro myricene and dihydroocinene;
  single ring alicyclic dienes, such as 1,3-cyclopentadiene, 1,4-cyclohexadiene, 1,5-cyclooctadiene and 1,5-yclododecadiene;
  multi-ring alicyclic fused and bridged ring dienes, such as tetrahydroindene, methyl tetrahydroindene, dicyclopentadiene, bicyclo-(2,2,1)-hepta-2,5-diene; and
  alkenyl, alkylidene, cycloalkenyl and cycloakylidene norbomenes, such as 5-methylene-2-norbomene (MNB), 5-propenyl-2-norbomene, 5-isopropylidene-2-norbomene,5-(4-cyclopentenyl)-2-norbomene, 5-cyclohexylidene-2-norbomene, 5-vinyl-2-norbomene and norbomadiene.

Preferred dienes are 1,4hexadiene (HD), 5-ethylidene-2-norbomene (E?NB), 5-vinylidene-2-norbomene (VNB), 5-methylene-2-norbomene (MNB) and dicyclopentadiene (DCPD).

Particularly preferred dienes are 5-ethylidene-2-norbornene (ENB) and 1,4-hexadiene (HD).

The non-conjugated dienes are generally incorporated into the terpolymer in an amount from 0.5% to about 20% by weight; preferably from 1% to 15% by weight, and more preferably from 2% to 10% by weight. If desired, more than one diene may be incorporated simultaneously, for example HD and ENB, with total diene incorporation within the limits specified above.

The diene can be impregnated into the porous polymer with various methods. For example, the porous polymer can be put in contact with a solution of the diene in a solvent such as propane, under stirring. The solvent is then removed, for example, by flashing the solution.

Non limitative examples of the transition metal catalyst component are compounds of titanium not containing metal-π bonds supported on a Mg halide, compounds of vanadium and metallocene compounds.

In an embodiment the catalyst system used in the process of the present invention comprises:
A) a compound of formula $TiCl_4$, $TiCl_3$ or $Ti(OT^1)_f T^2_{g-f}$, $T^1$ being a hydrocarbon radical containing up to 15 carbon atoms or a $-COT^3$ group, $T^3$ being a hydrocarbon radical containing up to 15 carbon atoms, $T^2$ being a halogen, f ranges from 1 to 4 and g is the valence of titanium, supported on Mg halide, preferably on active $MgCl_2$;
B) an internal electron-donor;
C) an aluminium-alkyl compound (Al-alkyl); and optionally
D) one or more external electron-donors.

Non-limiting examples of aluminium-alkyl compounds are compound of formula $H_j AlR^{17}_{3-j}$ or $H_j Al_2 R^{17}_{6-j}$, where $R^{17}$ substituents, same or different, are hydrogen atoms, halogen atoms, $C_1-C_{20}$-alkyl, $C_3-C_{20}$-cyclalkyl, $C_6-C_{20}$-aryl, $C_7-C_{20}$-alkylaryl or $C_7-C_{20}$-aylalkyl, optionally containing silicon or germanium atoms with the proviso that at least one $R^{17}$ is different from halogen, and j ranges from 0 to 1, being also a non-integer number. Example of these compounds are $Al(Me)_3$, $Al(Et)_3$, $AlH(Et)_2$, $Al(iBu)_3$, $AlH(iBu)_2$, $Al(iHex)_3$, $Al(iOct)_3$, $AlH(iOct)_2$, $Al(C_6H_5)_3$, $Al(CH_2-CH(Me)CH(Me)_2)_3$, $Al(CH_2C_6H_5)_3$, $Al(CH_2CMe_3)_3$, $Al(CH_2SiMe_3)_3$, $Al(Me)_2iBu$, $Al(Me)_2Et$, $AlMe(Et)_2$, $AlMe(iBu)_2$, $Al(Me)_2iBu$, $Al(Me)_2Cl$, $Al(Et)_2Cl$, $AlEtCl_2$ and $Al_2(Et)_3Cl_3$, wherein Me=methyl, Et=ethyl, iBu=isobutyl, iHex=isohexyl, iOct=2,4,4-trimethyl-pentyl. The above mentioned Al-alkyl compounds can be used either alone or in mixtures thereof Amongst the above aluminum compounds,
  trimethylaluminium (TMA), triisobutylaluminium (TIBAL) and tris(2,4,4-trimethyl-pentyl)aluminium (TIOA) are preferred.

The internal electron-donor compounds can be selected from ethers, esters, arnines, ketones and the like. Non-limiting examples are alkyl esters, cycloalkyls and aryls of polycarboxylic acids, such as phthalic and maleic esters and ethers, such as those which are described in EP-A 45977, the disclosure of which is incorporated herein by reference. The external donor can be the same or can be different from the internal donor. A particularly preferred class of external donor comprises alkyl or alkoxy silanes of formula $R^{1a}_c R^{2a}_d Si(OR^{3a})_e$ wherein $R^{1a}$, $R^{2a}$ and $R^{3a}$ equal to or different from each other are $C_1$–$C_{20}$ alkyl radical, c and d range from 0 to 2 being c+d equal to 1 or 2 and e is 2 or 3 being c+d+e=4. When using diether compounds as those as disclosed in the European patent application EP-A-361494, the stereospecificity of the catalyst is sufficiently high, such that the presence of an external-donor is not required.

Examples of these kind of catalysts are disclosed, for instance, in U.S. Pat. No. 4,399,054 and U.S. Pat. No. 5,221,651, the disclosure of which is incorporated herein by reference.

In another embodiment, the catalyst system used in the process of the present invention comprises:
A) a compound of formula $VCl_3$, $VCl_4$, $VOCl_3$, $VO(Ac)_3$, $V(Acac)_3$ or $VO(Ot^4)_3$ where $T^4$ is a $C_1$–$C_{10}$ alkyl group, Ac is an acetate group and Acac is an acetoacetate group; and
B) an aluminium-alkyl compound (Al-alkyl).

Aluminium alkyl compound are the aluminium compound disclosed above. Preferred vanadium compound is $V(Acac)_3$ used in conjunction with Aluminium aLkyl compound containing an halogen atom, preferably chlorine.

In a furher embodiment, the catalyst system used in the process of the present invention comprises:
(A) a metallocene compound belonging to the following formula (I)

$$(Cp)(ZR^1{}_m)_n(A)_rMX_p \qquad (I)$$

wherein $(ZR^1{}_m)_n$ is a divalent group bridging Cp and A; Z being C, Si, Ge, N or P, and the $R^1$ groups, equal to or different from each other, being hydrogen or linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl groups or two $R^1$ can form a aliphatic or aromatic $C_4$–$C_7$ ring;

Cp is a substituted or unsubstituted cyclopentadienyl group, optionally condensed to one or more substituted or unsubstituted, saturated, unsaturated or aromatic rings, containing from 4 to 6 carbon atoms, optionally containing one or more heteroatoms;

A is O, S, $NR^2$, $PR^2$ wherein $R^2$ is hydrogen, a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkl, or A has the same meaning of Cp;

M is a transition metal belonging to group 4, 5 or to the lanthanide or actinide groups of the Periodic Table of the Elements (IUPAC version);

the substituents X, equal to or different from each other, are monoanionic sigma ligands selected from the group consisting of hydrogen, halogen, $R^3$, $OR^3$, $OCOR^3$, $SR^3$, $NR^3{}_2$ and $PR^3{}_2$, wherein $R^3$ is a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl group, optionally containing one or more Si or Ge atoms; preferably, the substituents X are the same;

m is 1 or 2, and more specifically it is 1 when Z is N or P, and it is 2 when Z is C, Si or Ge;

n is an integer ranging from 0 to 4;

r is 0,1 or 2; preferably 0 or 1; n is 0 when r is 0 or 2;

p is an integer equal to the oxidation state of the metal M minus r+1; it ranges from 1 to 4; and (B) an alumoxane or a compound able to form an alkylmetallocene cation.

In the metallocene compound of formula (I), the divalent bridge $(ZR^1{}_m)_n$ is preferably selected from the group consisting of $CR^1{}_2$, $(CR^1{}_2)_2$, $(CR^1{}_2)_3$, $SiR^1{}_2$, $GeR^1{}_2$, $NR^1$, and $PR^1$, $R^1$ having the meaning reported above; more preferably, said divalent bridge is $Si(CH_3)_2$, $SiPh_2$, $CH_2$, $(CH_2)_2$, $(CH_2)_3$ or $C(CH_3)_2$.

The ligand Cp, which is π-bonded to said metal M, is preferably selected from the group consisting of cyclopentadienyl, mono-, di-, tri- and tetra-methyl cyclopentadienyl; 4-$^t$butyl-cyclopentadienyl; 4-adamantyl-cyclopentadienyl; indenyl; mono-, di-, tri- and tetra-methyl indenyl; 2-methyl indenyl, 3-$^t$butyl-indenyl, 4-phenyl indenyl, 4,5 benzo indenyl; 3-trimethylsilyl-indenyl; 4,5,6,7-tetrahydroindenyl; fluorenyl; 5,10-dihydroindeno[1,2-b]indol-10-yl; N-methyl- or N-phenyl-5,10-dihydroindeno [1,2-b]indol-10-yl; 5,6-dihydroindeno[2,1-b]indol-6-yl; N-methyl-or N-phenyl-5,6-dihydroindeno[2,1-b]indol-6-yl; azapentalene4-yl; thiapentalene-4-yl; azapentalene-6-yl; thiapentalene-6-yl; mono-, di- and tri-methyl-azapentalene-4-yl, 2,5-dimethyl-cyclopenta[1,2-b:4,3-b']-dithiophene.

The group A is O, S, $N(^2)$, preferably $R^2$ is methyl, ethyl, n-propyl, isopropyl, n-butyl, t-butyl, phenyl, p-n-butyl-phenyl, benzyl, cyclohexyl and cyclododecyl; more preferably $R^2$ is t-butyl;

preferably A is $N(R^2)$ or has the same meaning of Cp.

The metal M is preferably Ti, Zr or Hf. and more preferably Zr.

The substituents X are preferably the same and more preferably, the substituents X are selected from the group consisting of —Cl, —Br, -Me, -Et, -n-Bu, -sec-Bu, -Ph, -Bz, —$CH_2SiMe_3$, —OEt, —OPr, —OBu, —OBz and —$NMe_2$.

The variable m is preferably 1 or 2.

The variable n ranges preferably from 1 to 2, when n>1, the atoms Z can be the same or different from each other, such as in divalent bridges $CH_2$—O, $CH_2$—S and $CH_2$—$Si(CH_3)_2$.

The variable p is preferably 2.

Non limiting examples of compounds belonging to formula (1) are the rac and meso form (when present) of the following compounds:
bis(cyclopentadienyl)zirconiumdichloride;
bis(indenyl)zirconiumdichloride;
bis(tetrahydroindenyl)zirconiumdichloride;
bis(fluorenyl)zirconiumdichloride;
(cyclopentadienyl)(indenyl)zirconiumdichloride;
(cyclopentadienyl)(fluorenyl)zirconiumdichloride;
(cyclopentadienyl)(tetrahydroindenyl)zirconiumdichloride;
(fluorenyl)(indenyl)zirconiumdichloride;
dimethylsilanediylbis(indenyl)zirconiumdichloride,
dimethylsilanediylbis(2-methyl-4-phenylindenyl)zirconiumdichloride,
dimethylsilanediylbis(4-naphthylindenyl)zirconiumdichloride,
dimethylsilanediylbis(2-methylindenyl)zirconiumdichloride,
dimethylsilanediylbis(2-methyl-4-t-butylindenyl)zirconiumdichloride,
dimethylsilanediylbis(2-methyl-4-isopropylindenyl)zirconiumdichloride,
dimethylsilanediylbis(2,4-dimethylindenyl)zirconiumdichloride,
dimethylsilanediylbis(2-methyl-4,5-benzoindenyl)zirconiumdichloride,
dimethylsilanediylbis(2,4,7-trimethylindenyl)zirconiumdichloride,
dimethylsilanediylbis(2,4,6-trimethylindenyl)zirconiumdichloride,
dimethylsilanediylbis(2,5,6-trimethylindenyl)zirconiumdichloride, methyl(phenyl)silanediylbis(2-methyl-4,6-diisopropylindenyl)-zirconiumdichloride,
methyl(phenyl)silanediylbis(2-methyl4-isopropylindenyl)-zirconiumdichloride,
1,2-ethylenebis(indenyl)zirconiumdichloride,
1,2-ethylenebis(4,7-dimethylindenyl)zirconiumdichloride,
1,2-ethylenebis(2-methyl-4-phenylindenyl)zirconiumdichloride,
1,4-butanediylbis(2-methyl-4-phenylndenyl)zirconiumdichloride,
1,2-ethylenebis(2-methyl4,6-diisopropylindenyl)zirconiumdichloride,
1,4-butanediylbis(2-methylisopropylindenyl)zirconiumdichloride,
1,4-butanediylbis(2-methyl-4,5-benzoindenyl)zirconiumdichloride,
1,2-ethylenebis (2-methyl4,5-benzoindenyl)zirconiumdichloride,
[4-($\eta^5$-cyclopentadienyl)-4,6,6-trimethyl($\eta^5$-4,5-tetrahydropentalene)]dimethylzirconium,
[4-($\eta^5$-3'-trimethylsilylcyclopentadienyl)-4,6,6-trimethyl($\eta^5$-4,5-tetrahydropentalene)]dimnethylzirconium,
(tert-butylamido)(tetramethyl-$\eta^5$-cyclopentadienyl)-1,2-ethane-dimethyltitanium,
(methylamido)(tetramethyl-$\eta^5$-cyclopentadienyl)dimethylsilyl-dimethyltitanium,
(methylamido)(tetramethyl-$\eta^5$-cyclopentadienyl)-1,2-ethanediyl-dirnethyltitanium,
(tertbutylamido)-(2,4-dimethyl-2,4-pentadien-1-yl)dimethylsilyl-dimethyltitanium,
bis(1,3-dimethylcyclopentadienyl)zirconiumdichloride,
methylene(3-methyl-cyclopentadienyl)-7-(2,5-dimethylcyclopentadienyl-[1,2-b:4,3-b']dithiophene)zirconiumdichloride;
methylene(3-isopropyl-cyclopentadienyl)-7-(2,5-dimethyl-cyclopentadienyl-[1,2-b:4,3-b']dithiophene)zirconiumdichloride;
methylene(2,4dimethyl-cyclopentadienyl)-7-(2,5-dimethyl-cyclopentadienyl-[1,2-b:4,3-b']dithiophene)zirconiumdichloride;
methylene(2,3,5-trimethyl-cyclopentadienyl)-7-(2,5-diinethylcyclopentadienyl-[1,2-b:4,3-b']dithiophene)zirconiumdichloride;
methylene-1-(indenyl)-7-(2,5-dimethylcyclopentadienyl-[1,2-b:4,3-b']dithiophene)zirconiumdichloride;
methylene-1-(indenyl)-7-(2,5-ditrimethylsilylcyclopentadienyl-[1,2-b:4,3-b']dithiophene)zirconiumdichloride;
methylene-1-(3-isopropyl-indenyl)-7-(2,5-dimethylcyclopentadienyl-[1,2-b:4,3-b']dithiophene)zirconiumdichloride;
methylene-1-2-methyl-indenyl)-7-(2,5-dimethylcyclopentadienyl-[1,2-b:4,3-b']dithiophene)zirconiumdichloride;
methylene-1-(tetrahydroindenyl)7-(2,5-dimethylcyclopentadienyl-[1,2-b:4,3-b']dithiophene)zirconiumdichloride;
methylene(2,4-dimethyl-cyclopentadienyl)-7-(2,5-dimethylcyclopentadienyl-[1,2-b:4,3-b']dioxazol)zirconiumdichloride;
methylene(2,3,5-trimethyl-cyclopentadienyl)-7-(2,5-dimethylcyclopentadienyl-[1,2-b:4,3-b']dioxazol)zirconiumdichloride;
methylene-1-(indenyl)-7-(2,5-dimethylcyclopentadienyl-[1,2-b:4,3-b']dioxazol)zirconiumdichloride;
isopropylidene(3-methyl-cyclopentadienyl)-7-(2,5-bmethylcyclopentadienyl-[1,2-b:4,3-b']dithiophene)zirconiumdichloride;
isopropylidene(2,4-dimethyl-cyclopentadienyl)-7-(2,5-dibethylcyclopentadienyl-[1,2-b:4,3-b']dithiophene)zirconiumdichloride;
isopropylidene(2,4-diethyl-cyclopentadienyl)-7-(2,5-dimethylcyclopentadienyl-[1,2-b:4,3-b']dithiophene)zirconiumdichloride;
isopropylidene(2,3,5-timethyl-cyclopentadienyl)-7-(2,5 ethylcyclopentadienyl-[1,2-b:4,3-b']dithiophene)zirconiumdichloride;
isopropylidene-1-(indenyl)-7-(2,5-dimethylcyclopentadienyl-[1,2-b:4,3-b']dithiophene)zirconiumdichloride;
isopropylidene-1-(2-methyl-indenyl)-7-(2,5-ethylcyclopentadienyl-[1,2-b:4,3-b']dithiophene)zirconiumdichloride;
dimethylsilandiyl-1-(2-methyl-indenyl)-7-(2,5methylcyclopentadienyl-[1,2-b:4,3-b']dithiophene)hafiniumdichloride;
dimethylsilanediyl(3-tert-butyl-cyclopentadienyl)(9-fluorenyl)zirconiumdichloride,
dimethylsilanediyl(3-isopropyl-cyclopentadienyl)(9-fluorenyl)zirconiumdichloride,
dimethylsilanediyl(3-methyl-cyclopentadienyl)(9-fluorenyl)zirconiumdichloride,
dimethylsilanediyl(3-ethyl-cyclopentadienyl)(9-fluorenyl)zirconiumdichloride,
1-2-ethane(3-tert-butyl-cyclopentadienyl)(9-fluorenyl)zirconiumdichloride,
1-2-ethane (3-isopropyl-cyclopentadienyl)(9-fluorenyl)zirconiumdichloride,
1-2-ethane (3-methyl-cyclopentadienyl)(9-fluorenyl)zirconiumdichloride,
1-2-ethane (3-ethyl-cyclopentadienyl)(9-fluorenyl)zirconiumdichloride,
dimethylsilandiylbis-6-(3-methylcyclopentadienyl-[1,2-b]-thiophene)dichloride;
dimethylsilandiylbis-6-(4-methylcyclopentadienyl-[1,2-b]-thiophene)zirconiumdichloride;
dimethylsilandiylbis-6-(4-isopropylcyclopentadienyl-[1,2-b]-thiophene)zirconiumdichloride;
dimethylsilandiylbis-6-(4-ter-butylcyclopentadienyl-[1,2-b]-tiophene)zirconiumdichloride;
dimethylsilandiylbis-6-(3-isopropylcyclopentadienyl-[1,2-b]-hiophene)zirconiumdichloride;
dimethylsilandiylbis-6-(3-phenylcyclopentadienyl-[1,2-b]-thiophene)zirconiumdichloride;
dimethylsilandiylbis-6-(2,5-dimnethyl-3-phenylcyclopentadienyl-[1,2-b]-thiophene)zirconium di methyl;
dimethylsilandiylbis-6-[2,5-dimethyl-3-(2-methylphenyl)cyclopentadienyl-[1,2-b]-thiophene]zirconiumdichloride;
dimethylsilandiylbis-6-[2,5-dimethyl-3-(2,4,6-trimethylphenyl)cyclopentadienyl-[1,2-b]-thiophene]zirconiumdichloride;
dimethylsilandiylbis-6-[2,5-dimethyl-3-mesitylenecyclopentadienyl-[1,2-b]-thiophene]zirconiumdichloride;
dimethylsilandiylbis-6-(2,4,5-trimethyl-3-phenylcyclopentadienyl-[1,2-b]-thiophene)zirconiumdichloride;
dimethylsilandiylbis-6-(2,5-diethyl-3-phenylcyclopentadienyl-[1,2-b]-thiophene)zirconiumdichloride;
dimethylsilandiylbis-6-(2,5-diisopropyl-3-phenylcyclopentadienyl-[1,2-b]-thiophene)zirconiumdichloride;
dimethylsilandiylbis-6-(2,5-diter-butyl-3-phenylcyclopentadienyl-[1,2-b]-thiophene)zirconiumdichloride;
dimethylsilandiylbis-6-(2,5-ditriethylsilyl-3-phenylcyclopentadienyl-[1,2-b]-thiophene)zirconiumdichloride;
dimethylsilandiylbis-6-(3-methylcyclopentadienyl-[1,2-b]-silole)zirconiumdichloride;
dimethylsilandiylbis-6-(3-isopropylcyclopentadienyl-[1,2-b]-silole)zirconiumdichloride;
dimethylsilandiylbis-6-(3-phenylcyclop entadienyl-[1,2-b]-silole)zirconiumdichloride;
dimethylsilandiylbis-6-(2,5-dimethyl-3-phenylcyclopentadienyl-[1,2-b]-silole)zirconiumdichloride;
dimethylsilandiylbis-6-[2,5 dimethyl-3-(2-methylphenyl)cyclopentadienyl-[1,2-b]-silole] zirconiumdichloride;

dimethylsilandiylbis-6-[2,5-dimethyl-3-(2,4,6-trimethylphenyl)cyclopentadienyl-[1,2-b]-silole]zirconiumdichloride;
dimethylsilandiylbis-6-[2,5-imethyl-3-mesitylenecyclopentadienyl-[1,2-b]-silole]zirconiumdichloride;
dimethylsilandiylbis-6-(2,4,5-trimnethyl-3-phenylcyclopentadienyl-[1,2-b]-silole)zirconiumdichloride;
[dimethylsilyl(tert-butylamnido)][(N-methyl-1,2-dihydrocyclopenta[2,1-b]indol-2-yl)]titaniumdichloride;
[dimethylsilyl(tert-butyldo)][(6-methyl-N-methyl-1,2-dihydrocyclopenta[2,1-b]indol-2-yl)]titaniumdichloride;
[dimnethylsilyl(tert-butylamido)][(6-methoxy-N-methyl-1,2-dihydrocyclopenta[2,1-b]indol-2-yl)]titaniumdichloride;
[dimethylsilyl(tert-butylamido)][(N-ethyl-1,2-dihydrocyclopenta[2,1-b]indol-2-yl)]titaniumdichloride;
[dimethylsilyl(tert-butylamido)][(N-phenyl-1,2-dihydrocyclopenta[2,1-b]indol2-yl)]titaniumdichloride;
[dimethylsilyl(tert-butylamido)][(6-methyl-N-phenyl-1,2-dihydrocyclopenta[2,1-b]indol2-yl)]titaniumdichloride;
[dimethylsilyl(tert-butylamido)][(6-methoxy-N-phenyl-1,2-dihydrocyclopenta[2,1-b]indol2-yl)]titaniumdichloride;
[dimethylsilyl(tert-butylamido)][(N-methyl-3,4-dimethyl-1,2-dihydrocyclopenta[2,1-b]indol-2-yl)]titaniumdichloride;
[dimethylsilyl(tert-butylarnido)][(N-ethyl-3,4-dimethyl-1,2-diydrocyclopenta[2,1-b]indol-2-yl)]titaniumdichloride;
[dimethylsilyl(tert-butylamido)][(N-phenyl-3,4-dimnethyl-1,2-dihydroclopenta[2,1-b]indol-2-yl)]titaniumdichloride;

as well as the corresponding dimethyl, hydrochloro and dihydro compounds.

When A is $N(R^2)$, a suitable class of metallocene complexes (A) for use in the catalysts complexes of the invention comprises the well-known constrained geometry catalysts, as described in EP-A-0 416 815, EP-A-0 420 436, EP-A-0 671 404, EP-A-0 643 066 and WO-A-91/04257.

When the group A has the same meaning of Cp, it is preferably substituted or unsubstituted cyclopentadienyl, indenyl, tetrahydroindenyl (2,5-dimethyl-cyclopenta[1,2-b: 4,3-b']-dithiophene). such as the metallocene complexes described in WO 98/22486, WO 99/58539 WO 99/24446, U.S. Pat. No. 5,556,928, WO 96/22995, EP485822, EP-485820, U.S. Pat. No. 5,324,800 and EP-A-0 129 368.

A particularly preferred class of metallocene compounds has the following formulas (IIa) or (IIb)

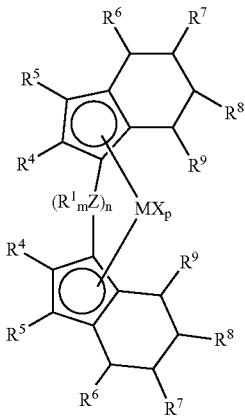

(IIa)

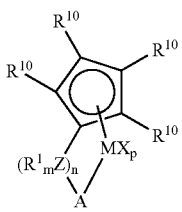

(IIb)

Wherein M, X, Z, $R^1$, m, n and p has been described above;

$R^4$, $R^5$, $R^6$, $R^7$, $R^8$ and $R^9$, equal to or different from each other, are selected from the group consisting of hydrogen, linear or branched saturated or unsaturated $C_1$–$C_{20}$-alkyl, $C_3$–$C_{20}$-cycloalkyl, $C_6$–$C_{20}$-aryl, $C_7$–$C_{20}$-alkylaryl, $C_7$–$C_{20}$-arylalkyl radical, optionally containing heteroatoms belonging to groups 13–17 of the Periodic Table of the Elements; or two adjacent groups can form a $C_4$–$C_7$ ring optionally containing O, S, N, P or Si atoms that can bear substituents; preferably:

$R^4$ is hydrogen, methyl, phenyl isopropyl;
$R^5$ is hydrogen, tertbutyl, isopropyl;
$R^6$ is hydrogen, methyl, phenyl, or form with $R^7$ a condensed benzene ring;
$R^7$ is hydrogen or forms with $R^6$ a condensed benzene ring;

When A is different from Cp another preferred class of metallocene compounds has formula (III)

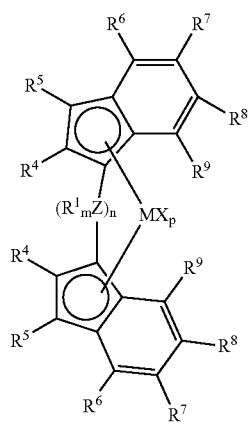

(III)

Wherein:
Wherein M, X, Z, R', m, n and p has been described above
A is O, S, $NR^2$, $PR^2$ wherein $R^2$ has the meaning reported above;

The groups $R^{10}$ equal to or different from each other are selected from the group consisting of hydrogen, linear or branched saturated or unsaturated $C_1$–$C_{20}$-alkyl, $C_3$–$C_{20}$-cycloallyl, $C_6$–$C_{20}$-aryl, $C_7$–$C_{20}$-alkylaryl, $C_7$–$C_{20}$-arylalkyl radical, optionally containing heteroatoms belonging to groups 13–17 of the Periodic Table of the Elements; or two adjacent groups can form a $C_4$–$C_7$ ring optionally containing O, S, N, P or Si atoms that can bear substituents;

Preferably:
M is titanium; the group $(R^1_mZ)_n$ is selected from the group consisting of dimethylsilyl, diphenylsilyl, diethylsilyl, di-n-propylsilyl, di-isopropylsilyl, di-n-butyl-silyl, di-t-butyl-silyl, di-n-hexylsilyl, ethylmethylsilyl, n-hexylmethylsilyl, cyclopentamethylenesilyl, cyclotetramethylenesilyl, cyclotrimethylenesilyl, methylene, dimethylmethylene and diethylmethylene; even more preferably, it is dimethylsilyl, diphenylsilyl or dimethylmethylene;

A is $NR^2$.

Preferred subclasses of metallocene compounds belonging to formula (III) have formulas (IVa) and (IVb)

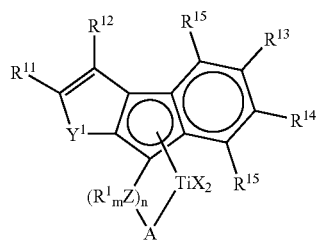

(IVa)

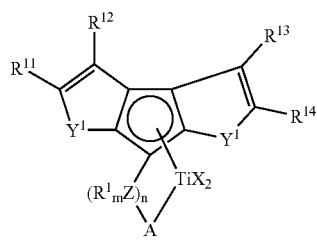

(IVb)

wherein M, X, Z, $R^1$, m, n and p has been described above; Ti is titanium; A is O, S, $NR^2$, $PR^2$ wherein $R^2$ has the meaning reported above;

the groups $R^{11}$, $R^{12}$, $R^{13}$, $R^{14}$ and $R^{15}$ are selected from the group consisting of hydrogen, linear or branched saturated or unsaturated $C_1$–$C_{20}$-alkyl, $C_3$–$C_{20}$-cycloallyl, $C_6$–$C_{20}$-aryl, $C_7$–$C_{20}$-alkylaryl, $C_7$–$C_{20}$-arylalkyl radical, optionally containing heteroatoms belonging to groups 13–17 of the Periodic Table of the Elements; or two adjacent groups can form a $C_4$–$C_7$ ring optionally containing O, S, N, P or Si atoms that can bear alkyl substituents;

$Y^1$ is an atom selected from the group consisting of $NR^{16}$, oxygen (O), $PR^{16}$ or sulfur (S), wherein the group $R^{16}$ is selected from the group consisting of linear or branched, saturated or unsaturated, $C_1$–$C_{20}$ alkyl, $C_6$–$C_{20}$ aryl and $C_7$–$C_{20}$ arylalkyl radical;

Alumoxanes used as component (B) can be obtained by reacting water with an organo-aluminium compound of formula $H_jAlR^{17}_{3-j}$ or $H_jAl_2R^{17}_{6-j}$, where $R^{17}$ substituents, same or different, are hydrogen atoms, halogen atoms, $C_1$–$C_{20}$-alkyl, $C_3$–$C_{20}$-cyclalkyl, $C_6$–$C_{20}$-aryl, $C_7$–$C_{20}$-alkylaryl or $C_7$–$C_{20}$-arylalkyl, optionally containing silicon or germanium atoms with the proviso that at least one $R^{17}$ is different from halogen, and j ranges from 0 to 1, being also a non-integer number. In this reaction the molar ratio of Al/water is preferably comprised between 1:1 and 100:1.

The molar ratio between aluminium and the metal of the metallocene is comprised between about 10:1 and about 20000:1, and more preferably between about 100:1 and about 5000:1.

The alumoxanes used in the catalyst according to the invention are considered to be linear, branched or cyclic compounds containing at least one group of the type:

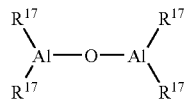

wherein the substituents $R^{17}$, same or different, are described above.

In particular, alumoxanes of the formula:

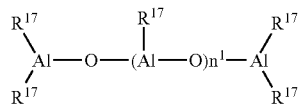

can be used in the case of linear compounds, wherein $n^1$ is 0 or an integer from 1 to 40 and the substituents $R^{17}$ are defined as above, or alumoxanes of the formula:

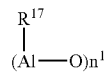

can be used in the case of cyclic compounds, wherein $n^1$ is an integer from 2 to 40 and the $R^{17}$ substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (IMBAO).

Particularly interesting cocatalysts are those described in WO 99/21899 and in WO01/21674 in which the alkyl and aryl groups have specific branched patterns.

Non-limiting examples of aluminium compounds according to said PCT applications are: tris(2,3,3-trimethyl-butyl) aluminium, tris(2,3-dimethyl-hexyl)aluminium, tris(2,3-dimethyl-butyl)aluminium, tris(2,3-dinethyl-pentyl) aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl) aluminium, tris(2-isobutyl-3-methyl-pentyl)aluminium, tris (2,3,3-trimethyl-pentyl)alumninium, tris(2,3,3-trimethyl-hexyl)aluminium, tris(2-ethyl-3,3-dimethyl-butyl) aluminium, tris(2-ethyl-3,3-dimethyl-pentyl)aluminium, tris (2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TI3AL), tris(2,4,4-trimethyl-pentyl)aluminium (TIOA), tris(2,3-dimethylbutyl)aluminiumn (TDMBA) and tris(2,3,3-trimethylbutyl) aluminium (TTMBA) are preferred.

Non-limiting examples of compounds able to form an alkylmetailocene cation that can be used as component (B) are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be able to be removed by an olefinic monomer. Preferably, the anion $E^-$ comprises of one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred examples of these compounds are described in WO 91/02012. Moreover, compounds of the formula $BAr_3$ can conveniently be used. Compounds of this type are described, for example, in WO 92/00333. Other examples of compounds able to form an alkylmetallocene cation are compounds of formula $BAr_3P$ wherein P is a substituted or unsubstituted pyrrol radicals, and B is a boron atom. These compounds are described in WO01/62764. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniurntetra(dimethylphenyl)borate,
Tributylammoniumtetra(trifluoromethylphenyl)borate,
Tributylamrnoniumtetra(4-fluorophenyl)borate,
N,N-Dimethylaniliniumtetra(phenyl)borate,
N,N-Diethylariliniurntetra(phenyl)borate,
N,N-Dimethylamlniumtetrakis(pentafluorophenyl)boratee,
N,N-Dimethylaniliniumtetrais(pentafluorophenyl)aluminate,
Di(propyl)ammoniumtetkis(pentafluorophenyl)borate,
Di(cyclohexyl)amnmoniumtetrakis(pentafluorophenyl)borate,
Triphenylphosphoniumtetrakisphenyl)borate,
Triethylphosphoniumtetrakis(phenyl)borate,
Diphenylphosphoniumtetraais(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetradis(pentafluorophenyl)aluminate,
Triphenylcarbeniumtetrakis(phenyl)alurninate,
Ferroceniumtetrakis(pentafluorophenyl)borate,
Fernoceniumtetrakis(pentafluorophenyl)aluminate.
Triphenylcarbeniumtetrakis(pentafluorophenyl)borate,
N,N-Dimethylaniliniumtetrakis(pentafluorophenyl)borate, Further compounds that can be used are those of formula RM'-O-M'R, R being an alkyl or aryl group, and M' is selected from an element of the Group 13 of the Periodic Table of the Elements (new IUPAC version). Compounds of this type are described, for example, in the International patent application WO 99/40129.

The catalyst system of the present invention can be supported on the porous alphaolefin polymer with various methods known in the art. For example to a suspension of the porous polymer, optionally containing the diene, in a solvent, such as propane, a solution or a suspension of the catalyst system can be injected under stirring and then the solvent is removed, for example by flashing. A particularly suitable process for supporting the catalyst system is described in WO 01/44319 wherein the process comprises the steps of:

(a) preparing a catalyst solution comprising a soluble catalyst component;
(b) introducing into a contacting vessel:
 (i) a porous support material in particle form, and
 (ii) a volume of the catalyst solution not greater than the total pore volume of the porous support material introduced;
(c) discharging the material resulting from step (b) from the contacting vessel and suspending it in an inert gas flow, under such conditions that the solvent evaporates; and
(d) reintroducing at least part of the material resulting from step (c) into the contacting vessel together with another volume of the catalyst solution not greater than the total pore volume of the reintroduced material.

To maximize the amount of catalyst component(s) deposited on the support particles the material resulting from step (d) can be subjected to further cycles of steps (c) and (d). The supported catalyst can be suitably recovered after a drying step (c).

The process of the present invention can also be used as the last step of a multistep process according to WO 96/11218 and WO 96/2583. In this way the porous alpha-olefin polymer is prepared in the first reactor then, after the impregnation steps, ethylene, alpha-olefin and diene can be polymerized.

Another object of the present invention is an heterophasic elastomeric polymer composition containing:

from 10% to 70% by weight, preferably between 15% and 50% by weight, more preferably between 25% and 50% by weight of a propylene homopolymer having the following characteristics:
 flexural modulus (METHOD ASTM D-5023) lower than 1200 Mpa; preferably lower than 1000 Mpa, more preferably lower than 900 Mpa;
 in the Temperature Rising Elution Temperature analysis (TREF) the fraction eluted at a temperature range from 25° C. to 97° is higher than 20% preferably higher than 30%; more preferably higher than 40% of the total polymer eluted; and
 a melting enthalpy lower than 90 J/g; preferably lower than 80 J/g;more preferably lower than 70 J/g;
 a pore volume greater than 0.45 cc/g (determined by mercury absorption); preferably greater than 0.5 cc/g; more preferably greater than 0.55 cc/g; and from 30% to 90% by weight, preferably between 85% and 50% by weight, more preferably between 75% and 50% by weight of an ethylene, propylene and non conjugated diene terpolymer containing:

from 20% to 90% by weight of ethylene derived units, more preferably from 30% to 85% by weight of ethylene, even more preferably from 35% to 80% by weight;

from 10% to 80% by weight of propylene derived units, more preferably from 20% to 65% by weight; and from 0.5% to 20% by weight of a non-conjugated dienes; preferably from 1% to 15% by weight, and most preferably from 2% to 10% by weight.

A further object of the present invention is a solid catalyst system comprising:

a porous alpha-olefin polymer impregnated with a non conjugated diene;

a transition metal catalyst component; and a suitable cocatalyst.

Preferably the porous aipha-olefin polymer is endowed with the following characteristics:

flexural modulus (METHOD ASTM D-5023) lower than 1200 MPa; preferably lower than 1000 MPa, more preferably lower than 900 MPa;

in the Temperature Rising Elution Temperature analysis (TREF) the fraction eluted at a temperature range from 25° C. to 97° is higher than 20% preferably higher than 30%; more preferably higher than 40%; and a melting enthalpy lower than 90 J/g; preferably lower than 80 J/g; more preferably lower than 70 J/g;

a pore volume greater than 0.45 cc/g (determined by mercury absorption); preferably greater than 0.5 cc/g; more preferably greater than 0.55 cc/g.

With the polymer obtained by the process of the present invention, thermoplastic elastomeric products having optimum elastomeric properties and a good balance of elasto-mechanical properties can be obtained after dynamic vulcanization.

Therefore a still further object of the present invention is a process for preparing a thermoplastic elastomeric composition comprising putting in contact the product obtained by the process described above with crosslinking agents and, if appropriate, coadjuvants thereof, at temperatures of between 140° C. and 240° C.

Among the various crosslinking techniques known in the art, the preferred technique is dynamic vulcanization. When working according to this technique, the compositions of the invention are subjected to kneading or to other shear forces in the presence of crosslinking agents and, if appropriate, coadjuvants thereof, at temperatures between 140° C. and 240° C., preferably at temperatures higher than the melting point of the crystalline phase. The compositions of the invention can be impregnated with an oil extender for regulating their hardness, either before the addition of the crosslinking agent or at the start or end of vulcanization. The oil extender used can be of various types, for example aromatic, naphthenic or preferably paraffinic. It is used in quantities such that weight ratios between the oil extender and component B of between 1:5 and 5:1, preferably between 1:2 and 2:1, are obtained.

The crosslinling agents which can be used are those commonly known in the art, such as organic peroxides, phenolic resins and sulphur. The selection of the crosslinking agent influences the properties of the final product. For example, by using phenolic resins a well known TWV can be obtained.

As coadjuvant compounds for the crosslnking, liquid 1,2-polybutadiene or compounds of the triallyl cyanurate type can be used.

Before they are subjected to dynamic vulcanization, the compositions of the invention can be charged with various additives, such as heat stabilizers, antioxidants, mineral fillers or any other type of agents customarily used in the art.

EXAMPLES

General Procedures

The data shown in the Examples relative to the properties of the porous polymers of the present invention were determined according to the methods indicated below.

MIL Flow Index: ASTM-D 1238

Intrinsic viscosity (I.V.): Measured in tetrahydronaphtalene (THN) at 135° C.

Fraction Soluble in Xylene:

2 g of polymer were dissolved in 250 ml of xylene at 135° C. under stirring. After 20 minutes the solution was left to cool, still under stirring, up to 25° C. After 30 minutes the precipitated material was filtered through filter paper, the solution was evaporated in nitrogen current and the residual was dried under vacuum al 80° C until it reached constant weight. Thus, the percentage of polymer soluble in xylene at room temperature was calculated.

Porosity (mercury): determined by immersing a known quantity of the sample in a known quantity of mercury inside a dilatometer and gradually hydraulically increasing the pressure of the mercury. The pressure of introduction of the mercury in the pores is in function of the diameter of the same. The measurement was carried out using a porosimeter "Torosimeter 2000 Series" (C. Erba). The total porosity was calculated from the volume decrease of the mercury and the values of the pressure applied.

The porosity expressed as percentage of voids is determined by absorption of mercury under pressure. The volume of mercury absorbed corresponds to the volume of the pores. For this determination, a calibrated dilatometer (diameter 3 mm) CD3 (Carlo Erba) connected to a reservoir of mercury and to a high-vacuum pump ($1.10^{-2}$ mbar) is used. A weighed amount of sample (about 0.5 g) is placed in the dilatometer. The apparatus is then placed under high vacuum (<0.1 mm Hg) and is maintained in these conditions for 10 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and the apparatus is pressurised with nitrogen (2.5 Kg/cm$^2$). Under the effect of the pressure, the mercury penetrates into the pores and the level goes down according to the porosity of the material. Once the level at which the mercury has stabilised has been measured on the dilatometer, the volume of the pores is calculated from the equation $V=R2\pi\Delta H$, where R is the radius of the dilatometer and $\Delta H$ is the difference in cm between the initial and the final levels of the mercury in the dilatometer. By weighting the dilatometer, dilatometer+mercury, dilatometer+mercury+sample, the value of the apparent volume $V_1$ of the sample prior to penetration of the pores can be calculated. The volume of the sample is given by:

$$V_1 = [P_1 - (P_2 - P)]/D$$

P is the weight of the sample in grams, $P_1$ is the weight of the dilameter+mercury in grams, $P_2$ is the weight of the dilatometer+mercury+sample in grams, D is the density of mercury (at 25° C.=13,546 g/cm). The percentage porosity is given by the relation:

$X=(100V)/V_1$.

Bulk density: DIN-53194.

Morphology: ASTM-D-1921-63.

Flexural modulus: ASTM D-5023.

Compression. Set: ASTM D395 22 hr/70° C.

Hardness Shore A: ASTM D2240.

Modulus 100, psi: ASTM D412.

Tensile strength: ASTM D412.

Elongation: ASTM D412.

Tension set: ASTM D412.

Temperature Rising Elution Fractionation (TREF) Tecnique: carried out as described in EP 658 577.

Preparation of the Polypropylene Matrix A

The solid titanium catalyst component was prepared according to example 2 of EP-A-395 083. Using 0.011 g of this solid, a propylene polymerization was carried out in a 4 1 autoclave equipped with magnetically driven stirrer and a thermostatic system, previously fluxed with nitrogen at 70° C. for one hour and then with propylene. Into the reactor at room temperature, without stirring but under propylene stream, a catalyst system consisting of a suspension of the solid component in 15 ml of hexane, 1.14 g of triethylaluminium, and 114 mg of dicyclopentyldimethoxysilane (donor D) is introduced, this system is prepared just prior to its use in the polymerization test.

The autoclave is then closed and 3 1 of hydrogen are introduced. Under stirring, 1.3 Kg of propylene was charged and the temperature was brought to 70° C. in 5 minutes, maintaining the value constant for two hours. At the end of the test, the stirring was stopped and the unreacted propylene was vented off. After cooling the autoclave to room temperature, the polymer is recovered and then dried at 70° C. under a nitrogen stream in an oven for 3 hours. 418 g of spherical polymer. The characteristics of the polymer are reported in table 1.

Preparation of the Polypropylene Matrix B

The solid titanium catalyst component was prepared according to example 2 of EP-A-395 083. A polymerization reactor was heated to 70° C., purged with a slow argon flow for 1 hour, its pressure was then raised to 100 psi-g with argon at 70° C. and then the reactor was vented. This procedure was repeated 4 more times. The reactor was then cooled to 30° C. Separately, into an argon purged addition funnel, the following were introduced in the order thay are listed; 75 mL of hexane, 4.47 mL of 1.5 M solution of triethylaluminum (TEAL) (0.764 g 6.70 mmol) in hexane, approximately 0.340 mmol of dicyclopentyl dimetoxy silane (donor D) (TEAL/D about 20:1) and allowed to stand for 5 minutes. Of this mixture, 35 mL was added to a flask. Then 0.0129 of the catalyst component previously prepared was added to the flask and mixed by swirling for a period of 5 minutes. The catalytic complex so obtained was introduced, under an argon purge, into the polymerization reactor at room temperature. The remaining hexane/TEAILsilane solution was then drained from the additional fimnel to the flask, the flask was swirled and drained into the reactor and the injection valve was closed. The polymerization reactor was slowly charged with 2.2. L of liquid propylene and $H_2$ while string. Then the reactor was heated to 70° C. maintaining the temperature and pressure constant for about 2 hours. After about two hours agitation was stopped and the remaining propylene was slowly vented. The reactor wwas heated to 80° C., pured with argon for 10 minutes and then cooled to room temperature and opened. The polymer waas removed and dried in a vacuum oven at 80° C. for 1 hour.

The characteristics of the polymer are reported in table 1.

Preparation of the Polypropylene Matrix C

The procedure for the preparation of the polymer matrix B was followed excepting that butylmethyldimetoxy silane (BuMeMS) was used as external donor instead of dicyclopentyl dimetoxy silane.

The characteristics of the polymer are reported in table 1.

Preparation of the Polypropylene Matrix D

The procedure for the preparation of the polymer matrix B was followed excepting that Octilmethyldimetoxy silane (OctMeMS) was used as external donor instead of dicyclopentyl dimetoxy silane.

The characteristics of the polymer are reported in table 1.

Examples 1–4

The type and amount of the polypropylene matrix indicated in table 2 was charged into a reactor of 4 L of capacity, under propane atmosphere (pressure 1 bar), at room temperature, without any stirring, then 250 g of propane were added at room temperature under stirring (a pressure of about 10 bar was achieved). 4,4 g of 5-ethylidene-2-norbomene (ENB) were added thereafter, by a little nitrogen overpressure, under stirring at room temperature for 10 minutes and then propane was flashed under stirring.

Further 250 g of propane were then added at room temperature under stirring and the temperature was brought to 40° C. In the meantime, a catalyst solution was prepared by dissolving rac-ethylenbis(tetrahydroindenyl)ZrCl$_2$ (rac EBTHIZrCl$_2$), methyl alumoxane (MAO) and Al(isooctyl)$_3$ (TIOA) in 10 ml of toluene at room temperature (amounts reported in table 2). After 10 minutes the catalyst solution was injected into the reactor by a little nitrogen overpressure. The suspension in the reactor was stirred at 40° C. for 10 minutes. Then the reactor was vented. Propane was added thereto, to achieve a pressure of 6 bar-g at 30° C. A 50/50 ethylene/propylene mixture was fed to the reactor, in 5 minutes, bringing the pressure to 20 bar-g and the temperature to 60° C. During the whole course of the polymerisation the temperature was kept constant at 60° and the pressure too was maintained constant at 20 bar-g by continuously feeding an ethylene/propylene mixture in a 60/40 wt/wt ratio. During the polymerisation 16 ml of a pentane solution containing an amount of ENB reported in table 1 was continuously added dropwise.

The polymerisation was stopped by quickly degassing the monomers. The polymer was plunged in 800 ml of methanol and filtered.

The filtered polymer was plunged again in 800 ml of methanol containing Irganox 1020, added to be about 200 ppm on the polymer.

Methanol was then evaporated with a nitrogen stream under reduced pressure at 60° C.

Polymerization data and characterization data of the obtained polymers are reported in table 2.

Vulcanization

The polymer obtained in examples 1–4 were vulcanized in a Brabender mixer by mixing the polymers until the plastic phase melt and the torque leveled off. At that time the cure system was added and mixing was continued for 4 minutes. The material was mixed at 80° C. and 100 RPM and the temperature rised during cure to about 200° C. The composition of the cured polymer is reported in table 3. Properties of the vulcanized polymers are reported in table 4.

TABLE 1

| PP Matrix | $H_2$ Mol % | I.V. (dl/g) | XSRT % | Bulk density g/cc | flexural modulus Mpa | melting enthalpy J/g | melting point | Pore volume cc/g | Average radius μm | TREF 25–97° C. % |
|---|---|---|---|---|---|---|---|---|---|---|
| A | n.a. | 1.49 | 3.50 | 0.36 | n.a. | n.a. | n.a | 0.54 | 8.7 | n.a. |
| B | 0.15 | 2.12 | 3.35 | 0.29 | 1500 | 89 | 164.8 | 0.67 | 15 | 8.0 |
| C | 0.10 | 1.53 | 9.24 | 0.31 | 920 | 87 | 159.9 | 0.58 | 14 | 41.0 |
| D | 0.10 | 1.48 | n.a. | 0.30 | 830 | 106 | 159.8 | 0.66 | 15 | 40.3 | n.a. = not available

TABLE 2

| Ex | PP Matrix (g) | EBTHI mg | MAO mmol | TIAO mmol | Al/Zr | Diene g | Time min | Activity Kg/gcat | ENB % wt | Et % wt | Split rubber % wt | I.V. tot (dl/g) |
|---|---|---|---|---|---|---|---|---|---|---|---|---|
| 1 | A (175) | 14 | 1.09 | 5.47 | 200 | 7.9 | 120 | 23.7 | 2.0 | 65 | 62 | 2.8 |
| 2 | B (150) | 14 | 1.09 | 5.47 | 200 | 9.7 | 55 | 22.5 | 2.5 | 61 | 68 | 2.0 |
| 3 | C (150) | 8 | 0.63 | 3.13 | 200 | 6.6 | 160 | 30.6 | 2.0 | 64 | 62 | 2.1 |
| 4 | D (150) | 8 | 0.63 | 3.13 | 200 | 8.36 | 110 | 37.5 | 2.3 | 61 | 68 | 2.0 |

TABLE 3

| EX | 1 | 2 | 3 | 4 |
|---|---|---|---|---|
| polymer | 161 | 149 | 161 | 149 |
| Paraffinic Oil Flexon 876 | 80 | 80 | 80 | 80 |
| Talc | 20 | 20 | 20 | 20 |
| ZnO | 5 | 5 | 5 | 5 |
| Resin SP 1055 | 4 | 4 | 4 | 4 |

Units are expressed as part by weight

TABLE 4

| Ex | PP wt % | C2 in EPDM wt % | ENB in EPDM wt % | Tension Set 100% room temperature % | Compression. Set 22 hr/70° C. % | Hardness Shore A | 50% Modulus MPa | 100% Modulus MPa | 200% Modulus MPa | Ultimate Elongation % | Tensile Strength MPa |
|---|---|---|---|---|---|---|---|---|---|---|---|
| 1 | 38 | 65 | 2.0 | 20 | 61 | 82 | 2.9 | 3.6 | 4.5 | 490 | 6.7 |
| 2 | 32 | 61 | 2.5 | 19 | 75 | 76 | 2.7 | 3.4 | 4.4 | 310 | 4.9 |
| 3 | 33 | 61 | 2.3 | 12 | 49 | 73 | 2.3 | 3.0 | 4.1 | 440 | 6.9 |
| 4 | 38 | 64 | 2.0 | 14 | 53 | 81 | 3.1 | 3.8 | 5.1 | 445 | 9.7 |

The invention claimed is:

1. A process for the preparation of elastomeric polymer compositions comprising polymerizing ethylene, an alpha-olefin $CH_2$=CHL, where L is an alkyl, cycloalkyl or aryl radical with 1–10 carbon atoms and a non-conjugated diene in the presence of a catalyst system comprising a transition metal catalyst component supported on a porous alpha-olefin polymer, wherein at least part of the diene is impregnated on the porous alpha-olefin polymer.

2. The process according to claim 1 wherein the porous alpha-olefin polymer has a pore volume greater than 0.45 cc/g (determined by mercury absorption).

3. The process according to claim 1 comprising the following steps:
   a) impregnating the porous alpha-olefin polymer with, in any order, the non conjugated diene and the catalyst system based on a transition metal compound, thereby forming a supported catalyst and
   b) polymerizing ethylene, the alpha olefin of formula $CH_2$=CHL where L is an alkyl, cycloalkyl or aryl radical with 1–10 carbon atoms, and optionally a non conjugated diene in the presence of the supported catalyst obtained in step a).

4. The process according to claim 3 wherein step a) comprises the following substeps:
   a1) first impregnating the porous alpha-olefin polymer with the non conjugated diene; and then
   a2) impregnating the porous alpha-olefin polymer obtained in step a1) with the catalyst system based on a transition metal compound.

5. The process according to claim 1 wherein the polymerization process is carried out in a gas phase.

6. The process according to claim 5 wherein the polymerization process is carried out in a fluidized bed reactor.

7. The process according to claim 1 wherein the porous alpha-olefin polymer is used in an amount between 10% and 70% by weight of the total polymer produced.

8. The process according to claim 1 wherein the porous alpha-olefin polymer is an homopolymer or copolymer of propylene.

9. The process according to claim 8 wherein the porous propylene homopolymer has the following characteristics:
flexural modulus lower than 1200 MPa;
in the Temperature Rising Elution Temperature analysis (TREF) the fraction, eluted at a temperature range from 25° C. to 97°, is higher than 20% of the total polymer eluted;
a melting enthalpy lower than 90 J/g;
a pore volume greater than 0.45 cc/g.

10. The process according to claim 3 wherein the polymer prepared in step b) contains from 20% to 90% by weight of ethylene derived units, from 10% to 80% by weight of an alpha-olefin derived units, and from 0.5% to 20% by weight of a non conjugated diene.

11. The process according to claim 1 wherein the catalyst system comprises a compound of Ti, not containing Metal-π bonds, and a Mg halide, optionally containing at least one electron donor compounds, a compound of V or a metallocene compound.

12. The process according to claim 11 wherein the catalyst system comprises:
A) a compound of formula $TiCl_4$, $TiCl_3$ or $Ti(OT^1)_f T^2_{g-f}$, wherein $T^1$ is a hydrocarbon radical containing up to 15 carbon atoms or a —$COT^3$ group, $T^3$ is a hydrocarbon radical containing up to 15 carbon atoms, $T^2$ is a halogen, f ranges from 1 to 4 and g is the valence of titanium, supported on Mg halide;
B) an internal electron-donor;
C) an aluminium-alkyl compound (Al-alkyl); and optionally
D) at least one external electron-donors.

13. The process according to claim 11 wherein the catalyst system comprises:
A) a compound of formula $VCl_3$, $VCl_4$, $VOCl_3$, vanadyl halides, $VO(Ac)_3$, $V(Acac)_3$ or $VO(OT^4)_3$ where $T^4$ is a $C_1$–$C_{10}$ alkyl group, Ac is an acetate group and Acac is an acetoacetate group; and
B) an aluminium-alkyl compound (Al-alkyl).

14. The process according to claim 11 wherein the catalyst system comprises:
(A) a compound belonging to the following formula (I)

$(Cp)(ZR^1_m)_n(A)_r MX_p$     (I)

wherein $(ZR^1_m)_n$ is a divalent group bridging Cp and A, Z is C, Si, Ge, N or P, and the $R^1$ groups, equal to or different from each other, are hydrogen or linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl groups or two $R^1$ can form a aliphatic or aromatic $C_4$–$C_7$ ring;
Cp is a substituted or unsubstituted cyclopentadienyl group, optionally condensed to one or more substituted or unsubstituted, saturated, unsaturated or aromatic rings, containing from 4 to 6 carbon atoms, optionally containing one or more heteroatoms;
A is O, S, $NR^2$, or $PR^2$ wherein $R^2$ is hydrogen, a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl, or A is a substituted or unsubstituted cyclopentadienyl group, optionally condensed to one or more substituted or unsubstituted, saturated, unsaturated or aromatic rings, containing from 4 to 6 carbon atoms, optionally containing one or more heteroatoms;
M is a transition metal belonging to group 4, 5 or to the lanthanide or actinide groups of the Periodic Table of the Elements (IUPAC version);
the substituents X, equal to or different from each other, are monoanionic sigma ligands selected from the group consisting of hydrogen, halogen, $R^3$, $OR^3$, $OCOR^3$, $SR^3$, $NR^3_2$ and $PR^3_2$, wherein $R^3$ is a linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl group, optionally containing one or more Si or Ge atoms;
m is 1 when Z is N or P, and it is 2 when Z is C, Si or Ge;
n is an integer ranging from 0 to 4;
r is 0, 1 or 2; n is 0 when r is 0 or 2;
p is an integer equal to the oxidation state of the metal M minus r+1; it ranges from 1 to 4; and
(B) one or more alumoxanes or compounds that form an alkylmetallocene cation.

15. A solid catalyst system comprising:
a porous alpha-olefin polymer impregnated with a non conjugated diene;
a transition metal catalyst component; and
a cocatalyst.

16. A process for preparing a thermoplastic elastomeric composition comprising contacting a product obtained by a process comprising polymerizing ethylene, an alpha-olefin $CH_2$=CHL, where L is an alkyl, cycloalkyl or aryl radical with 1–10 carbon atoms and a non-conjugated diene in the presence of a catalyst system comprising a transition metal catalyst component supported on a porous alpha-olefin polymer, wherein at least part of the diene is impregnated on the porous alpha-olefin polymer with crosslinking agents and, optionally coadjuvants of the crosslinking agents, at temperatures of between 140 and 240° C.

17. The process according to claim 12 wherein the compound is supported on active $MgCl_2$.

18. The process according to claim 14 wherein the substituents X are the same.

19. The process according to claim 14 wherein r is 0 or 1.

* * * * *